June 20, 1967

N. BOOK 3,326,607

APPARATUS FOR DISINTEGRATING MATERIALS BY MEANS OF LIQUID JETS

Filed Jan. 18, 1965

INVENTOR

Nils Book

BY
Stevens, Davis, Miller & Mosher,

ATTORNEYS

INVENTOR
Nils Book

BY
Stevens, Davis, Miller & Mosher, ATTORNEYS

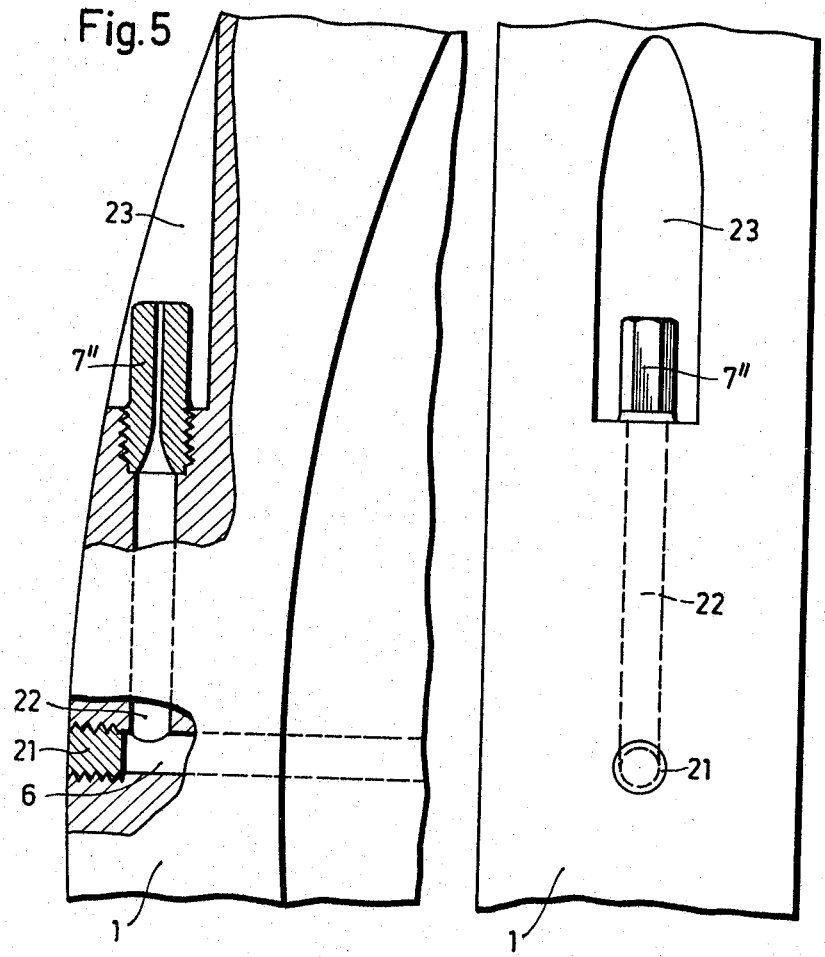

INVENTOR
Nils Book

BY
Stevens, Davis, Miller & Mosher, ATTORNEYS

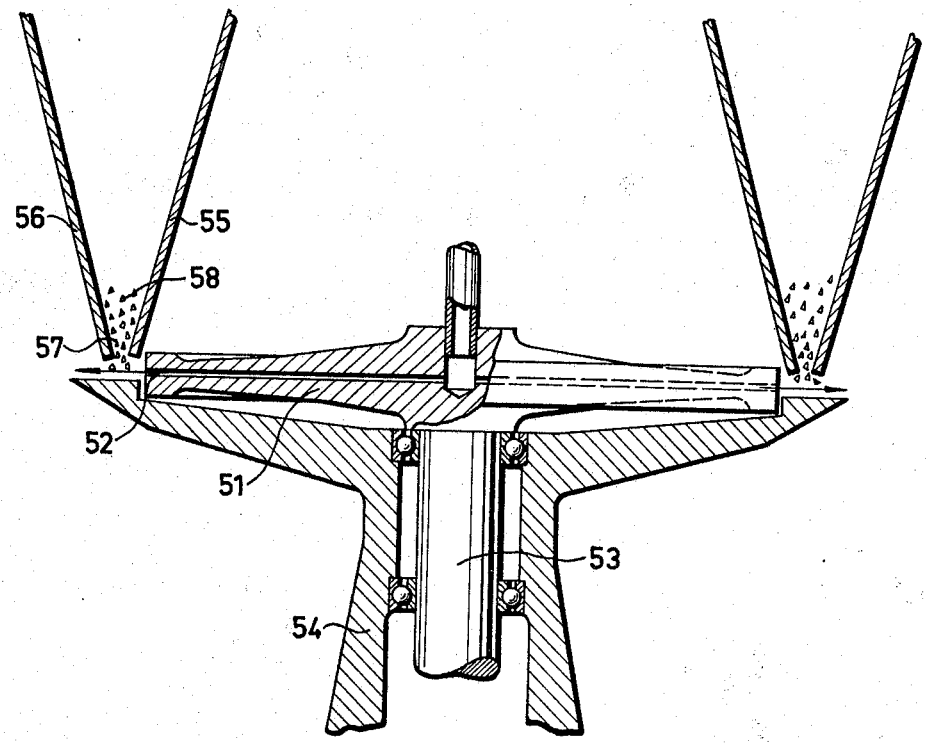

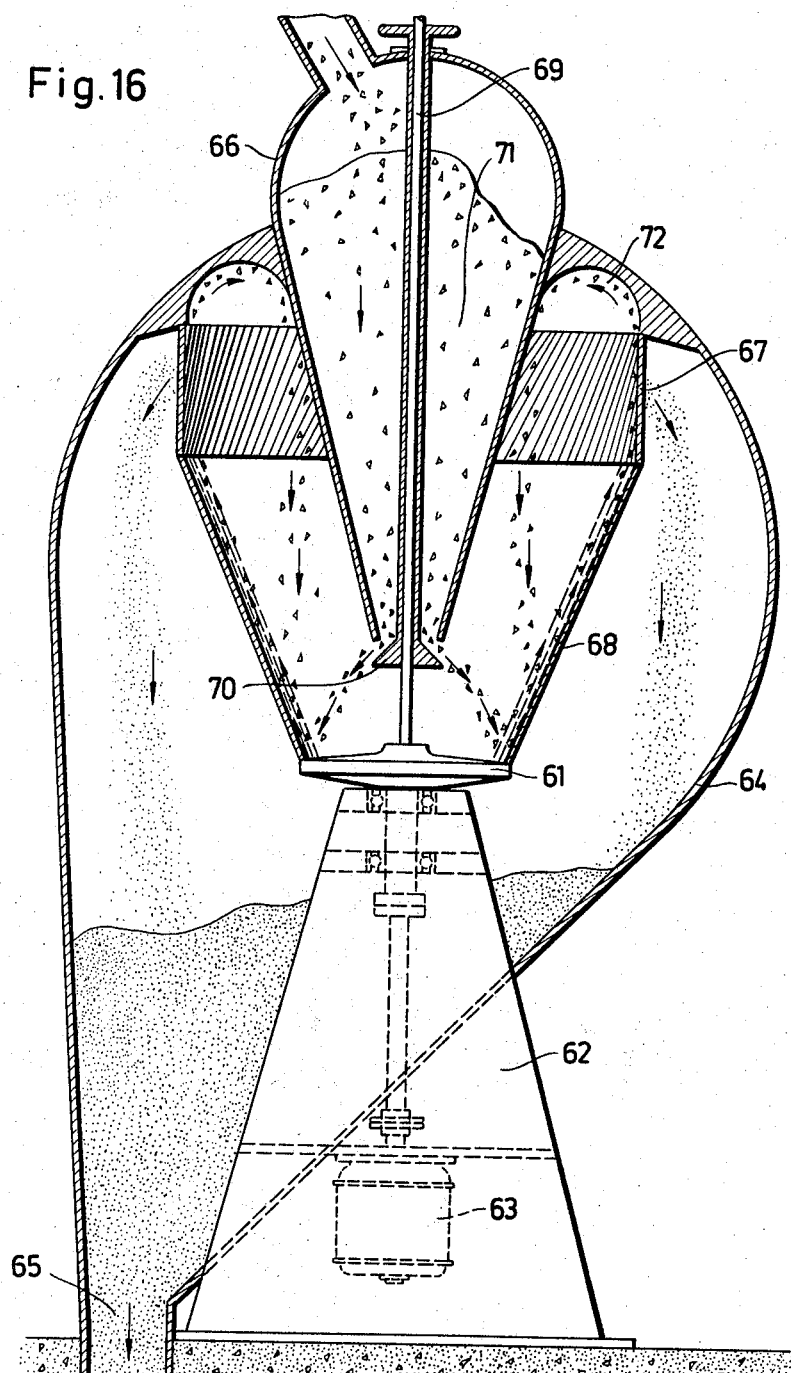

`United States Patent Office`

3,326,607
Patented June 20, 1967

3,326,607
APPARATUS FOR DISINTEGRATING MATERIALS BY MEANS OF LIQUID JETS
Nils Book, Motala, Sweden, assignor to Aktiebolaget Motala Verkstad, Motala Verkstad, Sweden, a corporation of Sweden
Filed Jan. 18, 1965, Ser. No. 426,066
Claims priority, application Sweden, Jan. 21, 1964, 735/64
8 Claims. (Cl. 299—58)

The present invention relates to an apparatus by means of which a high velocity can be imparted to a liquid jet whereby it can be used for disintegrating various materials.

The invention is based on the discovery that if a liquid is caused to flow through radial passages in a rotor rotating at high velocity and is caused to flow out from these passages through radially, tangentially or axially directed nozzles of considerably smaller area of flow than the passages, high velocity liquid jets are obtained that can disingtegrate practically all known matter.

The apparatus of this invention comprises a rotor adapted to be rotated at a great velocity and provided with radial passages terminating in nozzles of considerably smaller area of flow than said passages and means for supplying a liquid to said radial passages. During rotation, centrifugal force on the liquid in the passage creates a very large pressure head behind the nozzle. This head forces liquid through the restricted nozzle at tremendous velocity which adds vectorially to the peripheral velocity of the nozzle to give a resultant velocity which is greater than either the nozzle velocity or peripheral velocity alone.

The invention will be described more in detail with reference to the accompanying drawings, wherein:

FIGURES 3, 4 and 5-7 illustrate various arrangements for the nozzles;

FIGURE 15 shows a crusher machine embodying this invention; and

FIGURE 16 shows another embodiment of a crusher machine.

Figure 1:
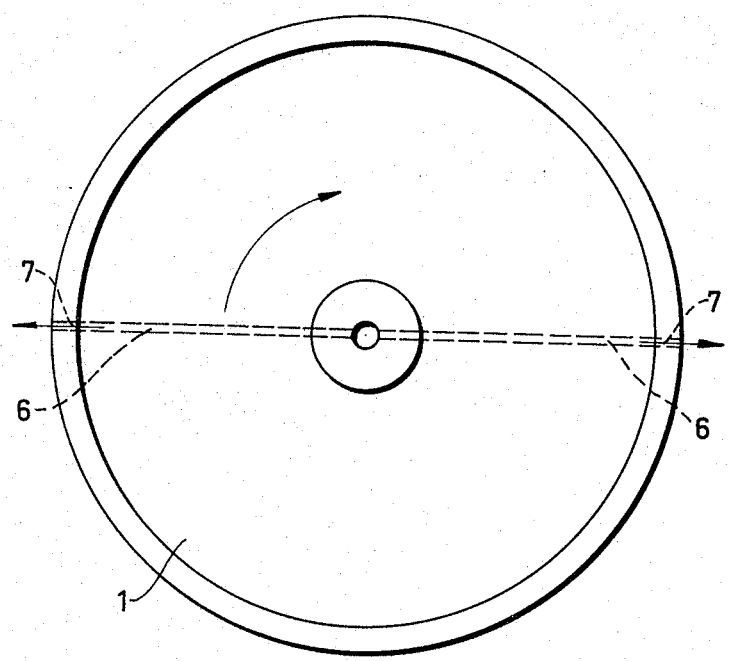
FIGURES 1 and 2 illustrate an embodiment of the apparatus of this invention in plan view and in cross-section, respectively.
Figure 2:
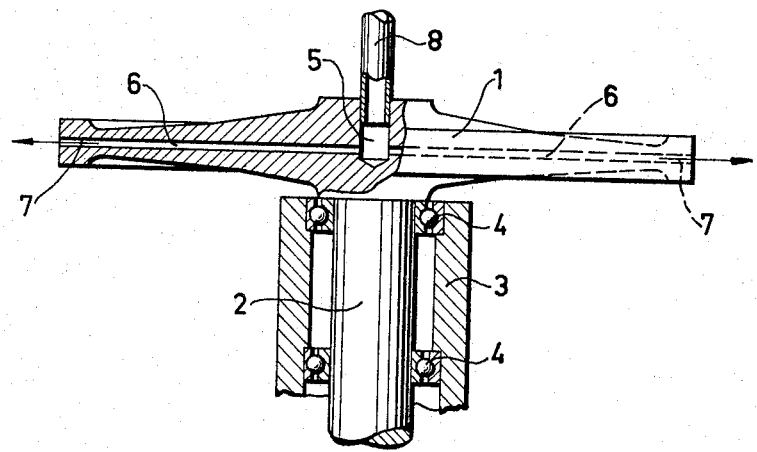

Referring to FIGURES 1 and 2 the apparatus shown therein comprises a rotor 1 consisting of a disc of substantially uniform strength and having a shaft 2 journalled in a frame 3 by means of bearings 4. A central passage 5 leads to the centre of the rotor, either along the axis of the shaft 2 or, as shown, from the opposite face of the rotor disc. From this central passage 5, other passages 6 of less diameter extend substantially radially out toward the circumference of the rotor where they terminate in jet nozzles 7 which have substantially less area of flow than the passages 6. In the embodiment of FIGURES 1 and 2 these jet nozzles are directed radially. A conduit 8 leads to the central passage 5.

Figure 3:
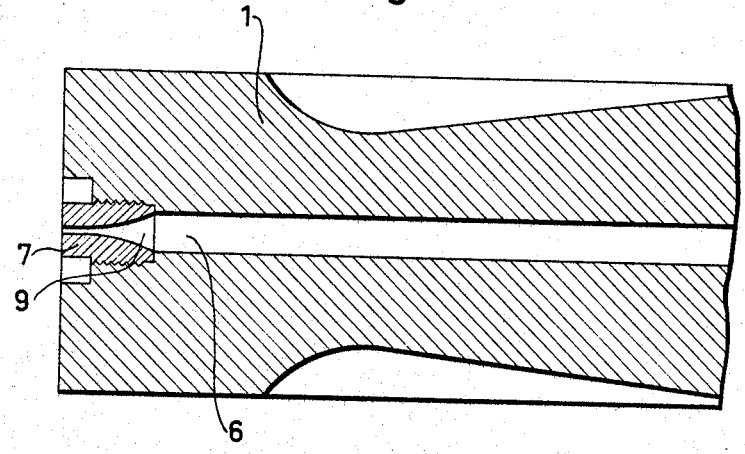

FIGURES 3, 4 and 5-7 show various forms of the jet nozzles. FIGURE 3 shows a radial jet nozzle 7 threadedly secured in the end of the radial passage 6 and having an axial bore 9 which tapers outwardly to an orifice of, e.g., 2 mm. diameter or less.

Figure 4:
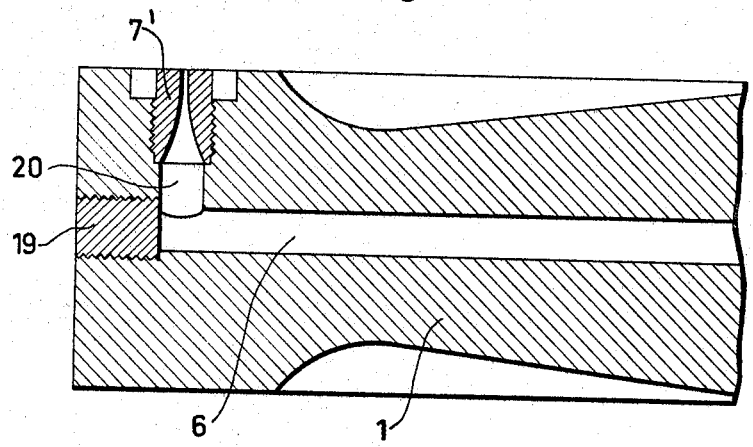

According to FIGURE 4, the outer end of the radial passage 6 is closed by a screw plug 19 and a passage 20 extending normal to the passage 6 is provided from one of the faces of the rotor disc. A nozzle 7' similar to the nozzle 7 in FIGURE 3 is provided in the passage 20.

According to FIGURES 5, 6 and 7 the radial passage 6 is also closed by a screw plug 21 and a substantially tangential passage 22 is bored normal to the passage 6 from a recess 23 provided in the circumferential surface of the rotor. A nozzle 7" of substantially the same design as the nozzle 7 is inserted into the passage 22.

Although the nozzles are shown in FIGURES 3-7 as radial, axial and tangential, it is of course possible to arrange them directed in any intermediate positions, if desired for specific applications.

The rotor of FIGURES 1 and 2, equipped with nozzles according to FIGURE 3, FIGURE 4 or FIGURES 5-7 or similar nozzles is adapted to be rotated at a high circumferential speed, e.g. of the order of 500 m. per second or more, by means which are not shown in these figures. Thus, e.g., a motor or turbine can be connected directly to the shaft 2, or the shaft will be provided with a gear, pulley or the like to be driven over a gear transmission, belt transmission or the like. This will be shown more in detail in connection with the embodiments shown hereinafter.

Figure 8:
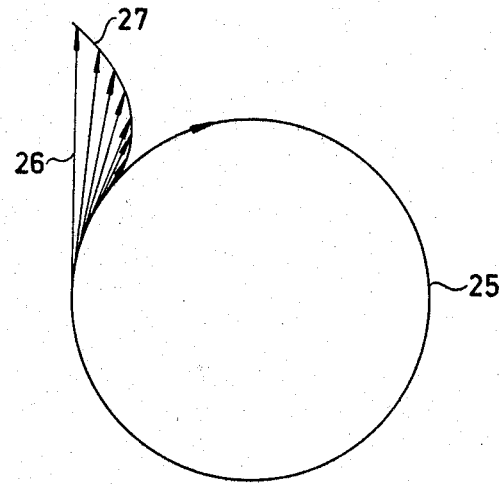
FIGURES 8 to 11 are sketches which serve to clarify the principles of the invention.
Figure 9:
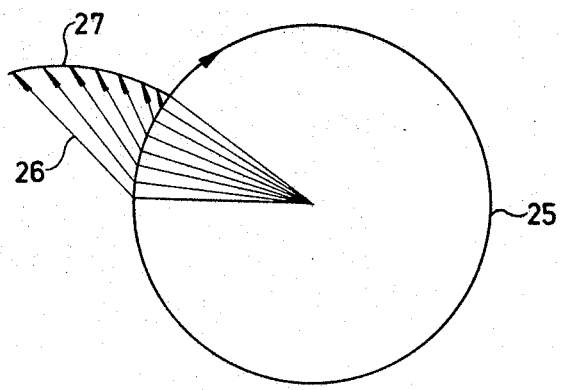
Figure 10:
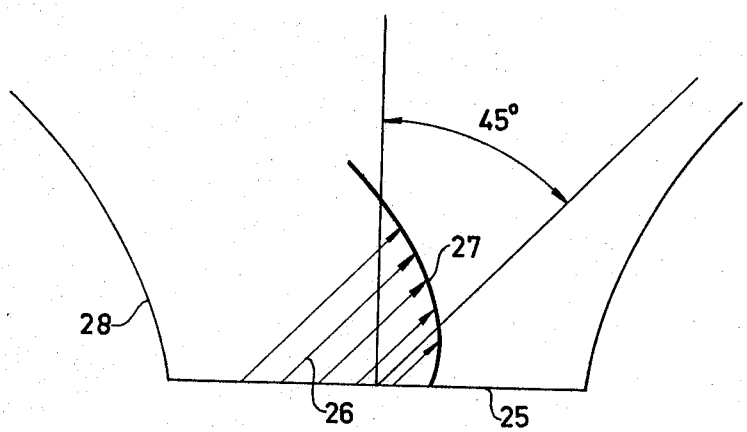
Figure 11:
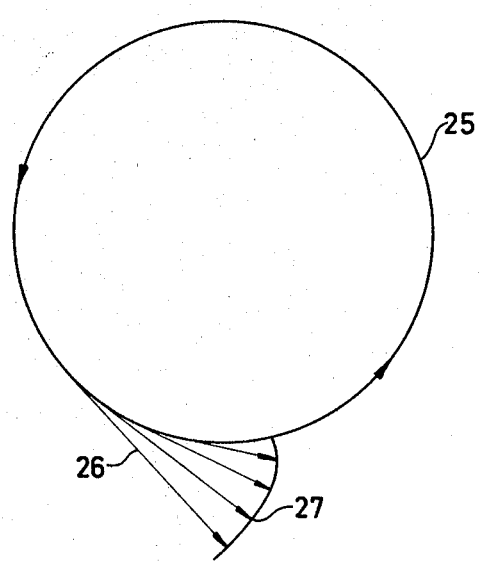

The action of the rotor will now be described with reference to FIGURES 8 to 11 which show diagrammatically the movement of the liquid particles thrown out from the nozzles. In these figures, the circle 25 represents the circle around which the nozzles rotate, the arrows 26 represent the direction of movement of the individual particles and the curve 27 represents the continuous jet. FIGURE 8 relates to tangential disposition of the nozzles, as in FIGURES 5-7. FIGURE 9 relates to radial disposition of the nozzles according to FIGURES 1, 2 and 3. FIGURES 10 and 11 relate to axial disposition of the nozzles according to FIGURE 4, FIGURE 10 being an elevation and FIGURE 11 a plan view.

If a liquid is supplied through conduit 8 to the passage 5 while the rotor rotates, the liquid is forced by the centrifugal action out into the passages 6 and then flows out through the nozzles 7. Since the nozzle bore area is substantially less than the area of the passage 6, a liquid pressure which increases progressively with the distance from the centre of the rotor is obtained in the passages 6. Thus, it will be possible to obtain a considerably increased pressure in front of the nozzles, whereby the liquid flows out at a great velocity.

Disregarding the loss of velocity in the jet nozzle (about 2 to 4%), it will be found according to known laws that the jet velocity is equal to the circumferential velocity of the nozzle around the rotor centre.

The absolute particle velocity in the jet is the resultant of the velocity of flow and the circumferential velocity. If the nozzle direction is radial (FIGURE 9), the absolute particle velocity of the liquid will be equal to the square root of twice the circumferential velocity of the nozzle. The same value is obtained, if the nozzle is directed axially, i.e. parallel to the rotor shaft (FIGURES 10, 11). If the nozzle is directed tangentially to the circle of rotation of the nozzle and in the direction of rotation (FIGURE 8), the absolute particle velocity will be the sum of the velocity of flow and the circumferential velocity. The maximum surface pressure generated by the jet when it impinges on a stationary surface is proportionate to the square of the absolute particle velocity, i.e. this pressure will be 2 to 4 times that corresponding to the circumferential velocity of the rotor.

The calculation for a water jet rotor will be shown below together with some examples. The nozzle direction will be assumed tangential to the circle of rotation, with the nozzles directed in the direction of rotation, except in Example 3 where the nozzles are axial. Similar calculations for other examples may readily be made guided by the examples given.

If the distance from the nozzle orifices to the rotor centre is designated $r$ meters and the rotor speed is $n$ r.p.m., the circumferential velocity of the nozzle will be $$V_1 = \frac{\pi 2 r n}{60} \text{ m./sec.}$$

and the angular velocity $$w = \frac{\pi n}{30} \text{ radians/sec.}$$

The hydrostatic pressure in front of the nozzles will be $$C = \frac{w^2 r^2}{2g} \cdot \frac{1}{10} = \frac{V_1^2}{20g} \text{ kg./cm.}^2$$

($g$=gravity acceleration in m. per sq. sec.).
The velocity of flow of the water $$V_2 = \mu \sqrt{2gC \cdot 10} = \mu \sqrt{\frac{2gV_1^2}{20g} \cdot 10} = \mu V_1 \text{ m./sec.}$$

$\mu$=efficiency of the jet nozzle which will be assumed equal to 0.96 below.
Total jet velocity=$V_1 + V_2 = V_1 + \mu V_1 = 1.96 V_1$ m./sec.
The jet can generate a maximum surface pressure $$P = \frac{3.84 \cdot V_1^2}{20g} \text{ kg./cm.}^2$$

Rate of flow $Q = 10 \mu V_1 A$ dm.$^3$/sec.
$A$=total area of flow in sq. dm.

Power consumption $N = \frac{1.96 Q V_1^2}{75g}$ HP

*Example 1*

Radius of rotation of the jet nozzle 0.4 m. Two jet nozzles disposed diametrically opposite to each other. Water jet diameter 0.5 mm. corresponding to an area of 0.196 sq. mm. Rotor speed 14,000 r.p.m. The rotor is made from hardened chrome nickel steel. The nozzles are made from hard metal which is about 2000 times more wear resistant than hardened steel $$V_1 = \frac{\pi \cdot 2 \cdot 0.4 \cdot 14000}{60} = 587 \text{ m./sec.}$$

$$C = \frac{587^2}{20g} = 1760 \text{ kg./cm.}^2$$

$$P = \frac{3.84 \cdot 587^2}{20g} = 6750 \text{ kg./cm.}^2$$

$$Q = 10 \cdot 0.96 \cdot 587 \cdot \frac{2 \cdot 0.196}{10,000} = 0.221 \text{ dm.}^3/\text{sec.}$$

$$N = \frac{1.96 \cdot 0.221 \cdot 587^2}{75g} = 203 \text{ HP}$$

If the rotor axis is vertical, a horizontal jet field will be obtained. A fixed point in the jet field will be struck $2 \cdot 14,000/60 = 467$ times per second by a jet. If a particle is allowed to fall freely through the jet field starting from a point 2 cm. above the jet plane, its velocity through the field will be $\sqrt{20 \cdot 2 \cdot 1000g} = 628$ mm./sec., and the particle must be less than $628/467 = 1.35$ mm. in diameter to have a chance of passing through the field without being hit by a jet.

*Example 2*

This example is intended to show which surface pressure can be obtained by direct coupling of a 3000 r.p.m. electric motor to the rotor.

Rotation radius of the jet nozzle 0.5 meter. 16 nozzles of 0.5 mm. jet diameter, corresponding to $16 \cdot 0.196$ sq. mm. $n$=3000 r.p.m.

$$V_1 = \frac{\pi 2 \cdot 0.5 \cdot 3000}{60} = 157 \text{ m./sec.}$$

$$C = \frac{157^2}{20g} = 125 \text{ kg./cm.}^2$$

$$P = \frac{3.84 \cdot 157^2}{20g} = 482 \text{ kg./cm.}^2$$

$$Q = 10 \cdot 0.96 \cdot 157 \cdot \frac{16 \cdot 0.196}{10,000} = 0.473 \text{ dm.}^3/\text{sec.}$$

$$N = \frac{1.96 \cdot 0.473 \cdot 157^2}{75g} = 31 \text{ HP}$$

By increasing the radius of rotation of the jet nozzles, it will, of course, be possible to obtain considerably higher surface pressures.

*Example 3*

In this example, the surface pressure will be calculated when the rotor is provided with nozzles directed axially with respect to the rotor axis.

The rotor is supposed to have two axially directed nozzles disposed diametrically and on a distance of 0.6 m. from the rotor centre. A jet diameter of 1 mm. gives an area of 1.6 mm.$^2$ for 2 jets.

Rotor speed=8000 r.p.m.

Circumferential velocity of the nozzles=

$$\frac{\pi \cdot 1.2 \cdot 8000}{60} = 500 \text{ m./sec.}$$

Hydrostatic pressure in front of the nozzles $$= 500^2/20g = 1275 \text{ kg./cm.}^2$$

Velocity of flow=$0.96 \cdot 500 = 480$ m./sec.
Absolute jet velocity=$\sqrt{480^2 + 500^2} = 690$ m./sec.

Maximum surface pressure=$\frac{690^2}{20g} = 2440$ kg./cm.$^2$

Volumetric rate of flow=$\frac{480 \cdot 10 \cdot 1.6}{10,000} = 0.77$ dm.$^3$/sec.

Power consumption=$\frac{0.77 \cdot 500^2}{75g} = 260$ HP

To this must be added the ventilation work and friction on the air of the rotor.

The water jets will form a funnel-shaped jet field coaxial around the imaginary extension of the rotor axis (lines 28 in FIGURE 10).

As shown hereinbefore, it will be possible with the apparatus disclosed herein, to produce water jets which result in very high surface pressures when they strike a stationary surface. The maximum hydrostatic surface pressure will be the same, whether the surface is struck by a continuous jet or a single water particle. It is only the duration of the hydrostatic surface pressure which is less in the latter case. In the latter case, there will also appear appreciably higher surface pressures of a very short duration due to impact. When a water particle strikes a matter which has a compression strength lower than the specific surface pressure generated by the water particle, a portion of that matter will be crushed.

Experiments have been made in laboratories to find out how water jets of a high velocity act on various materials when they strike them. Thus, e.g., the following experiment was made in the laboratory of a well-known concern.

A water-filled high-pressure vessel had a nozzle through which a very thin water jet could be obtained. The jet was generated when a lead ball was shot into the vessel with a great power and velocity through a 75 cm. long tube. It is reported that in this manner it was possible to obtain jet velocities of up to 1500 m./sec. (corresponding to a maximum surface pressure of about 11,500 kg./cm.$^2$).

Each jet impact caused a small cavity in the matter struck by the jet. According to the report of the experiment, it was possible in this manner to cut through all metals. For stellite and tungsten, however, the work was slower than for other metals. It was pointed out that the method hitherto lacks practical usefulness. This must be interpreted so that no rational method of achieving so high water velocity is available.

By the present invention, however, it will be possible to produce, with a very high efficiency, water jets of sufficiently high velocities to be able to crush several material, among them all kinds of rocks, with an enormous intensity.

The power loss in the rotor can be estimated to a few percent, whereto must, of course, be added the loss in the motor and any transmission.

Figure 12:
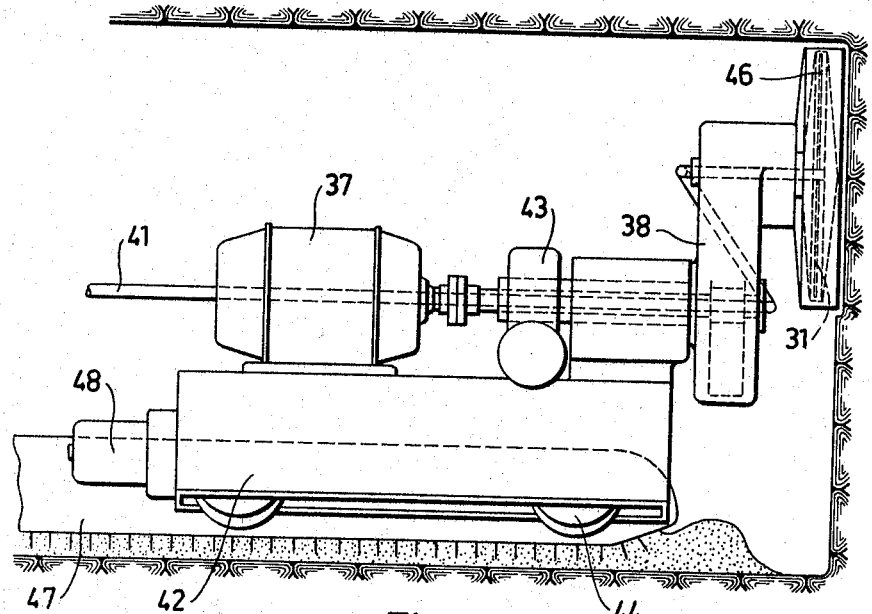
FIGURES 12 and 13 show a machine according to this invention for boring tunnels, in elevation and in end-view, respectively.
Figure 13:
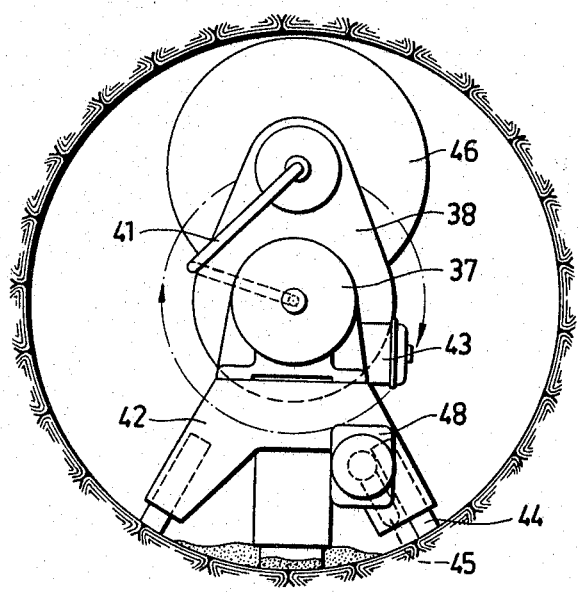
Figure 14:
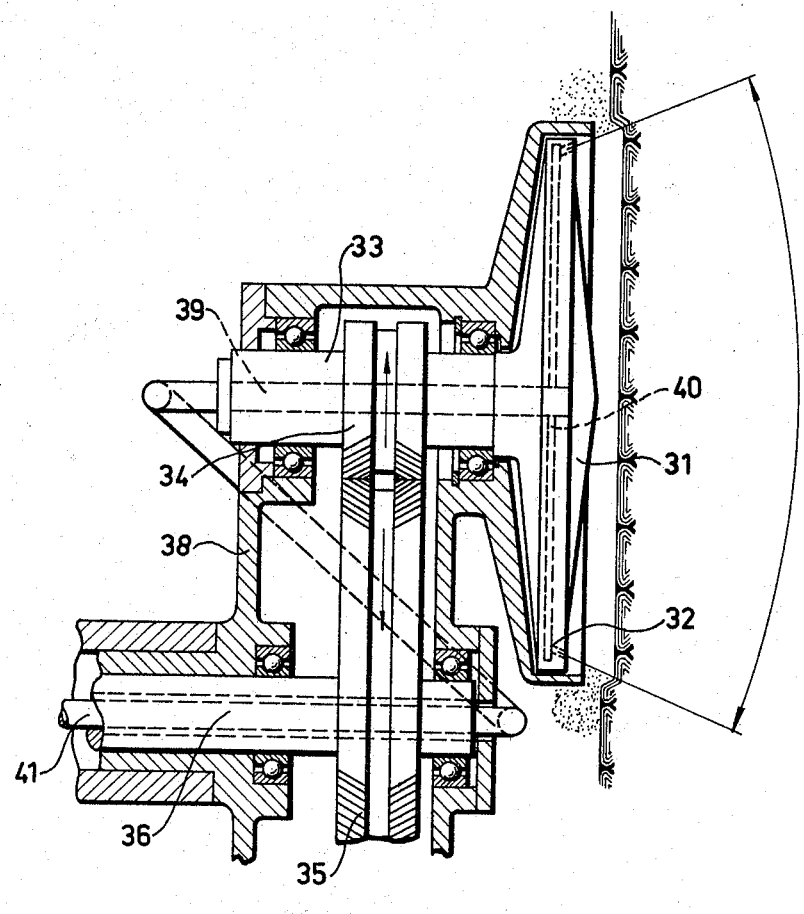
FIGURE 14 shows a portion of the machine of FIGURE 12 on an enlarged scale.

FIGURES 12 to 14 illustrate more in detail a machine intended to realize the invention for boring tunnels or mines. The machine has a disc-shaped rotor 31 with axially directed nozzles 32. The rotor shaft 33 is provided with gears 34 to be driven by gears 35 provided on the shaft 36 of a motor 37. The gear diameters are so chosen that the distance between the axes of the motor 37 and the rotor 31 is approximately equal to the radius of rotation of the jet nozzles. The rotor is journalled in the gear housing 38 at the opposite side to the motor, and its shaft 33 which extends through the gear housing 38 has an axial bore 39 for supplying water to the radial rotor passages 40 which communicate with the nozzles 32. The motor 37 is disposed on an axially movable frame 42. The gear housing 38 with the rotor 31 is rotatable around the motor shaft 36 and journalled in the frame 42. A separately driven worm gear 43 is arranged to drive the gear housing 38 with the rotor 31 slowly around the motor shaft while the motor 37 drives the rotor 31.

The rotor and motor shafts are horizontal. The frame 42 has four wheels 44, whereof two are combined each with a worm gear wheel in a worm gear 45 the worm of which is driven by a motor 48. The rotor is covered by a protective casing 46 which is open only in front in the jet direction.

Water for the rotor is supplied through a pipe 41, which extends through the hollow motor shaft 36 and the gear housing 38 and then passes around the gear housing to be connected to the hollow rotor shaft 33, where sealing is obtained by a stuffing-box or similar means.

The water jet rotor can be made, e.g., with the data according to Example 3, i.e.:

Rotational radius of the jet nozzle 0.6 m.
2 axially directed nozzles of 1 mm. jet diameter.
Circumferential velocity of the nozzles 500 m./sec.
Absolute jet velocity 690 m./sec.
Amount of water flowing out 0.77 kg./sec.
Power 260 HP plus the air friction work.

The water jets form a funnel-shaped jet field around the extension of the rotor axis (see FIGURE 10).

If the machine is placed with the rotor facing a vertical rock-wall and is started, the following action is obtained.

The water jets bombard the rock-wall with a maximum surface pressure of 2440 kg./cm.$^2$. Since all rocks have a compression strength considerably lower than said specific surface pressure (for granite which is one of the hardest rocks, the compression strength varies between 1000 and 1500 kg./cm.$^2$), the rock-wall will be crumbled. The rocks are brittle and do not withstand alternating tensions in the same manner as tough materials. In this case, the rock subjected to the water jets will be subjected to $2 \cdot 8000/60 =$ about 270 pressure variations per second. Thus, it is not only the magnitude of the surface pressure, but also the intensity in the pressure variation, which will determine the capacity of material removal.

Since the rotor turns not only about its own axis but also turns slowly about the motor axis, the resulting cavity in the rock-wall will have a circular cross-section of a diameter somewhat greater than the double rotor diameter, i.e., in this case about 2.5 m. At the same time, the frame is continuously moved forwardly by the motor 48, the worm gears 45 and the wheels 44 at a speed corresponding to the rate of material removal per unit time. The process can advantageuosly be automated. The disintegrated rock will be continuously moved away, e.g. by a scraper conveyor 47, suggested in FIGURE 12.

By turning the motor, gear housing with rotor and associated members 90° on the frame, the rotor can work the rock-wall while the machine moves in parallel therewith. In this manner, it will be possible to expand a tunnel or mine.

The machine will have a considerable capacity, and in addition the following advantages, which are even more valuable, will be obtained.

(1) The transport of the removed rock is simplified, since it is obtained directly in powdered form. Thus, it can be pumped away, if there is present a certain amount of water which has to be carried away. In this connection, it may be mentioned that transport in many cases accounts for about 95% of all work in mining.

(2) In practically all mining work, the mined ore-containing rock is nowadays subjected to flotation. For this purpose it has to be disintegrated by crushing and grinding. The new method in accordance with this invention results in a pulverisation of the rock which is so good that the material can be subjected to flotation directly without further disintegration.

(3) It is evident that by this new method it is not to be feared that great fissures are formed in the rock, as occurs in blasting, resulting in a danger of slides and necessitating additional work for removing loose rocks from the roof of the mine or tunnel.

From the above, it will be seen that the advantages of this new method are extraordinary and that this method will be very important for tunnel building and mining.

FIGURE 15 shows schematically a machine for crushing material with an apparatus according to this invention. The machine comprises a rotor 51 having radially directed nozzles 52 and disposed on a vertical shaft 53 journalled in a frame 54. A feeder device consisting of an inner upwardly tapering cone 55 and an outer downwardly tapering cone 56 is disposed above the rotor so that the clearance 57 between the cones is coaxial with the rotor 51 and disposed slightly beyond the rotor periphery and slightly above the plane of the nozzles 52. Material 58 to be crushed is fed through the clearance 57 and is crushed by the liquid jets leaving the nozzles.

Another embodiment of a crushing apparatus according to this invention is shown in FIGURE 16. This apparatus comprises a rotor 61 having axially disposed jet nozzles, journalled in a frame 62 which encloses the driving motor 63. An outer container 64 is sealingly in engagement with the frame 62 and has an outlet tube 65. In the top of the container 64, there are disposed an inner container 66, a cylindrical jacket 67 consisting of spaced ribs and therebelow a frusto-conical jacket 68, said members being coaxial with the rotor 61. Extending along the axis of the inner container is a water supply pipe 69 for the rotor 61, as well as a displaceable conical bottom valve 70 for the container 66 whereby supply of material 71 to be crushed can be controlled. The material is directed to the circumference of the rotor at the lower smaller end of the frustoconical jacket 68. The axial nozzles of the rotor are disposed, e.g., at three different distances from the rotor axis and form a conical jet field, which is closely surrounded by the jacket 68. The material fed from the container 66 is crushed in the jet field and is entrained by the jets along the jacket 68 and hits the ribs 67, between which water and sufficiently finely crushed material pass to the outer container. The coarse material continues to the top wall of the container 64 which between the container 66 and the jacket 67 has an annular rounded cavity 72. There, the direction of movement is reversed and the material returns to the jet field to be subjected to further crushing action.

This apparatus is particularly suitable for disintegrating tough materials, such as wood chips, which can be subdivided into fibers with less danger of splitting of the fibers themselves than in other apparatus. The water can be heated to a temperature even higher than the boiling point at atmospheric pressure, since the system is closed and can withstand superatmospheric pressure.

I claim:

1. Apparatus for producing liquid jets or drops of such a high velocity that they can be used to disintegrate materials, comprising a rotor arranged to rotate at a peripheral velocity of at least 100 meters per second and provided with radial passages terminating in nozzles each having an area of flow substantially less than the area of flow of the associated passage, means for supplying said passages with a liquid only, and means for rotating said rotor so that the rotator rotation provides centrifugal force on the liquid in the passages to create a pressure head at the nozzle and a high velocity jet through the nozzle which exhausts the nozzle with a velocity which is the vector sum of the nozzle jet velocity and the nozzle peripheral velocity.

2. An apparatus as in claim 1, in which said nozzles are directed radially.

3. An apparatus as in claim 1, in which said nozzles are directed tangentially.

4. An apparatus as in claim 1, in which said nozzles are directed axially.

5. An apparatus as in claim 1, having means for feeding material to be disintegrated annularly around a rotor having radial nozzles.

6. An apparatus as in claim 1, comprising a rotor arranged to rotate about a vertical axis and having axially upwardly directed nozzles, a conical jacket surrounding the conical jet field generated by the nozzles, a cylindrical screening means arranged above the conical jacket, means for feeding materials to be disintegrated disposed above the rotor within the conical jacket, and a container for receiving disintegrated material surrounding the cylindrical screening means and the conical jacket.

7. An apparatus as in claim 1 for removal of rock for tunneling, mining and the like, wherein the rotor has axially directed nozzles and is arranged on a horizontal shaft on a movable frame, the rotor shaft with the rotor being arranged to move along a closed path around a fixed axis in the frame.

8. An apparatus as in claim 7, in which the rotor is arranged to be driven by a motor carried on the frame over a gear transmission of cylindrical gears, the diameters of which are such that the distance between the motor and rotor axes is substantially equal to the diameter of rotation of the rotor nozzles, the gear transmission with the rotor being arranged to rotate aound the motor axis.

References Cited
UNITED STATES PATENTS

| | | | |
|---|---|---|---|
| 2,018,926 | 10/1935 | Schroepfer | 299—17 |
| 2,188,716 | 1/1940 | Jacobovics | 51—9 |
| 2,314,069 | 3/1943 | Blount | 51—9 |
| 2,678,203 | 5/1954 | Huff | 299—17 X |

FOREIGN PATENTS

| | | |
|---|---|---|
| 410,355 | 3/1925 | Germany. |
| 140,776 | 3/1963 | U.S.S.R. |

ERNEST R. PURSER, *Primary Examiner.*